Figure 1:
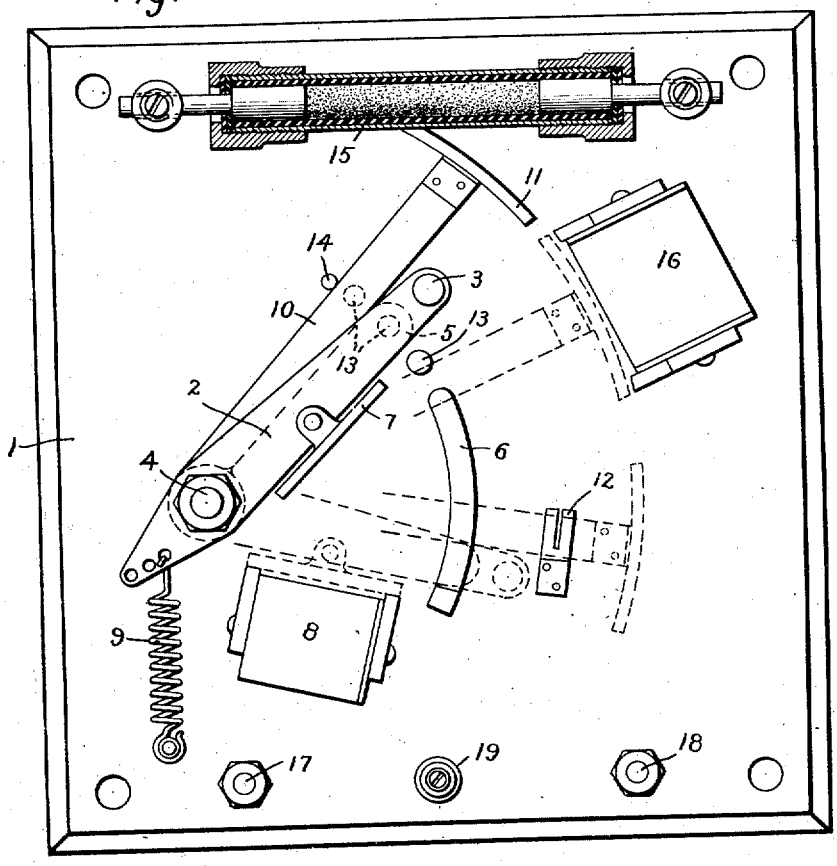

E. SCHATTNER.

CONTROLLER.

APPLICATION FILED SEPT. 12, 1910.

Reissued Dec. 6, 1910.

13,178.

2 SHEETS—SHEET 1.

WITNESSES

J. Earl Ryan

J. Ellis Glen

INVENTOR

ERNEST SCHATTNER

BY Albert G. Davis

HIS ATTORNEY

E. SCHATTNER.

CONTROLLER.

APPLICATION FILED SEPT. 12, 1910.

Reissued Dec. 6, 1910.

13,178.

2 SHEETS—SHEET 2.

WITNESSES

J. Earl Ryan

J. Ellis Glen.

INVENTOR

ERNEST SCHATTNER

BY Albert G. Davis

HIS ATTORNEY

UNITED STATES PATENT OFFICE.

ERNEST SCHATTNER, OF LONDON, ENGLAND, ASSIGNOR TO GENERAL ELECTRIC COMPANY, A CORPORATION OF NEW YORK.

CONTROLLER.

13,178. Specification of Reissued Letters Patent. Reissued Dec. 6, 1910.

Original No. 775,501, dated November 22, 1904, Serial No. 207,759. Application for reissue filed September 12, 1910. Serial No. 581,736.

*To all whom it may concern:*

Be it known that I, ERNEST SCHATTNER, a subject of the King of Great Britain, residing at London, England, have invented certain new and useful Improvements in Controllers, of which the following is a specification.

This invention relates to controllers for electric motors, and particularly to that type of controllers known as "motor-starting rheostats." Its main object is to provide such a rheostat by which a smooth resistance gradient will be obtained, and I accomplish this by employing a self-reducing resistance—that is, a resistance the ohmic value of which is decreased by the passage of the current through it.

Prior to my invention the common practice has been to provide motor-starting rheostats with wire resistances connected to studs arranged in an arc of a circle and a pivoted switch-arm coöperating with the studs. With such a device the resistance is cut into and out of the motor-circuit in steps. Obviously a starting-rheostat with which a smooth resistance gradient is obtained would give more satisfactory results. It has long been known that certain substances possess a negative temperature coefficient of resistance—that is, they decrease in ohmic value when heated—and such substances have been termed "self-reducing" substances. Some substances possess this characteristic to such an extent that they may be used in place of hand-operated resistances in electric circuits where it is desirable that the resistance be great when the current is first applied and shall then be gradually reduced. Among such substances magnetite possesses this self-reducing characteristic to a marked degree, and is thus particularly well suited for use as a starting resistance for electric motors and for similar purposes.

In a companion application filed by me March 31, 1904, and serially numbered 200,881, is described a self-reducing resistance unit having magnetite and a silicate mixed in proper proportions and held within a tube under pressure.

My present invention particularly relates to a motor-starting rheostat employing such a self-reducing resistance and provided with switching mechanism by which the circuit to the motor may be closed through the resistance, and in order that the self-reducing-resistance material may cool, and thus be in readiness to again properly start the motor whenever that is desired, I arrange the parts so that the resistance may be short-circuited as soon as the motor is up to speed.

Another object of my invention is to provide means whereby the resistance is short-circuited automatically when its ohmic value has fallen to a predetermined amount.

My invention also relates to certain features of general application to motor starting rheostats and switches.

The novel features of my invention will be definitely indicated in the claims appended hereto.

The details of construction and the mode of operation of my improved motor-starting rheostat will be better understood by reference to the following description, taken in connection with the accompanying drawings, which show the preferred embodiment of my invention.

Figure 2:
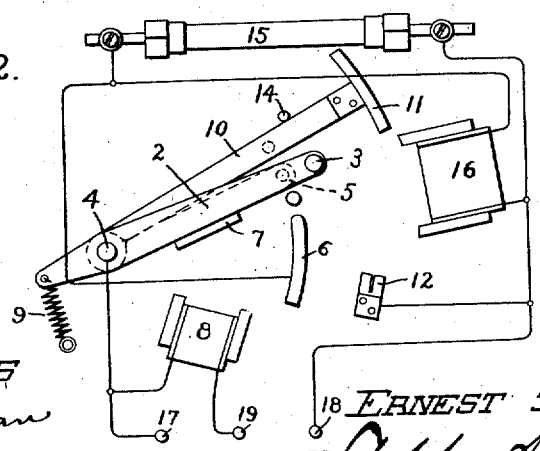
Figure 3:
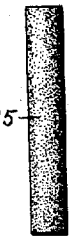

In the drawings, Figure 1 is a plan view of the rheostat. Fig. 2 is a diagrammatic view of the same. Fig. 3 is an elevation of the resistance; and Figs. 4 and 5 are a plan and diagrammatic view, respectively, of a modification.

Referring first to Figs. 1 and 2, 1 indicates a base-plate of soapstone or other suitable insulating material, and 2 is a switch-arm provided with an operating-handle 3 and pivotally mounted on a bolt 4, supported on the base-plate. Secured to the under side of switch-arm 2 is a leaf-spring 5, arranged to engage a contact segment 6 when the switch-arm is turned on its pivot. Secured to the switch-arm is an armature 7, which when the arm is moved to the limit of its travel engages the pole-pieces of a magnet 8, mounted on the base-plate, and the arm is then held in this position by the magnet as long as the latter is energized. A coiled spring 9, having one end attached to the switch-arm 2 and the other to a stud mounted on the base-plate, is arranged to return the arm to the "off" position when magnet 8 is deënergized. Independently pivoted on the bolt 4 is an auxiliary switch-arm 10, preferably of copper, having secured to its end a curved cross-piece 11, of iron or other material of good permeability. Mounted on the base-plate is a switch-clip 12, which is engaged by the auxiliary switch-arm 10 when the latter is moved to its final position. The rheostat is mounted on its support in a vertical position, so that the auxiliary switch-arm 10 would normally rest by gravity against and be mechanically supported by the spring 5, extending down from the under side of the switch-arm 2, and would follow the switch-arm 2 when it is turned on its pivot. Spring 5 is held on the level of segment 6 when the arm is in the off position by the studs 13, mounted on the base 1, and a stop 14 is provided to arrest the movement of the switch-arm when retracted by the spring 9. Mounted on the upper portion of the base-plate 1 is the self-reducing resistance 15, preferably consisting of one or more units constructed as described in my companion application above mentioned. Also mounted on the base-plate is an electro-magnet 16, the polepieces of which extend in proximity to the path of movement of the curved cross-piece 11 and are preferably adjustable toward and away from that path to vary the air gap. By reference to Fig. 2 it will be seen that the switch-arm is connected to a binding-post 17, which is to be connected to one side of the line, and that the segment 6 is connected to one terminal of the resistance 15, the other terminal of which is connected with the switch-clip 12 and to a binding-post 18 for connection to the motor-armature; also, that the magnet 16 is connected in shunt to the resistance 15.

As thus constructed the operation of the controller is as follows: One side of the line is connected to the binding-post 17, and the motor armature and field are connected to the binding-posts 18 and 19, respectively. The motor-field and the retaining-magnet 8 in series therewith are thus constantly energized while the voltage is on the lines. To start the motor, the switch-arm 2 is turned on its pivot to the lowest position shown in dotted lines in Fig. 1, where it is held by the retaining-magnet 8 against the tension of spring 9. This movement brings the contact-spring 5 into engagement with segment 6, thus closing circuit to the motor-armature through the self-reducing resistance 15 and the coils of the magnet 16 in parallel. The current flowing in this circuit divides in passing through the two parallel paths in inverse relation to the resistance of these paths, and as the ohmic value of the resistance 15 is high when circuit is first closed a comparatively large current flows through the magnet 16 and the latter is strongly energized. The auxiliary switch-arm 10 falls by gravity, with the arm 2, to the intermediate position shown in dotted lines in Fig. 1, where its movement is arrested or suspended by the direct magnetic pull of the magnet 16, the flux of which threads the iron cross-piece 11 on the switch-arm 10. The flow of current through the self-reducing resistance 15 causes its ohmic value to fall gradually, and consequently a larger proportion of the current flows through resistance 15 and a smaller proportion through the coils of magnet 16, the total current diminishing as the counter electromotive force of the motor rises. The magnet 16 thus has impressed on its terminals an automatically decreasing electromotive force until finally the magnet becomes so weakened that it no longer retards the movement of switch-arm 10 and the latter falls by gravity to the lowest position shown in dotted lines in Fig. 1, where it engages the switch-clip 12, thus short-circuiting the resistance 15 and the magnet 16 and connecting the motor-armature directly across the lines. The ohmic value of the self-reducing resistance 15 is so proportioned that it admits current to the motor-armature in such amount as to bring the motor up to speed without dangerous overloading, and the proportions of magnetite or other material and the silicate with which it is mixed may be varied to adjust the rate of decrease of the resistance as desired between wide limits. In every case, however, the decrease of the resistance is smooth and gradual as contradistinguished from the step-by-step decrease obtained with the forms of motor-starting rheostats commonly used prior to my invention. The resistance of the coils of magnet 16 is so proportioned relatively to that of resistance 15 that the auxiliary switch-arm 10 is dropped after the ohmic value of resistance 15 has fallen and the counter electromotive force of the motor has risen to a predetermined amount. The time required for this drop in the resistance is practically constant under ordinary conditions of service. In case the voltage of the lines should fall abnormally the magnet 8 would be so weakened as to release the switch-arm 2 and both arms would be retracted by the spring 9 to the position shown in full lines in Fig. 1, in which position the circuit of the motor-armature is open.

Figure 4:
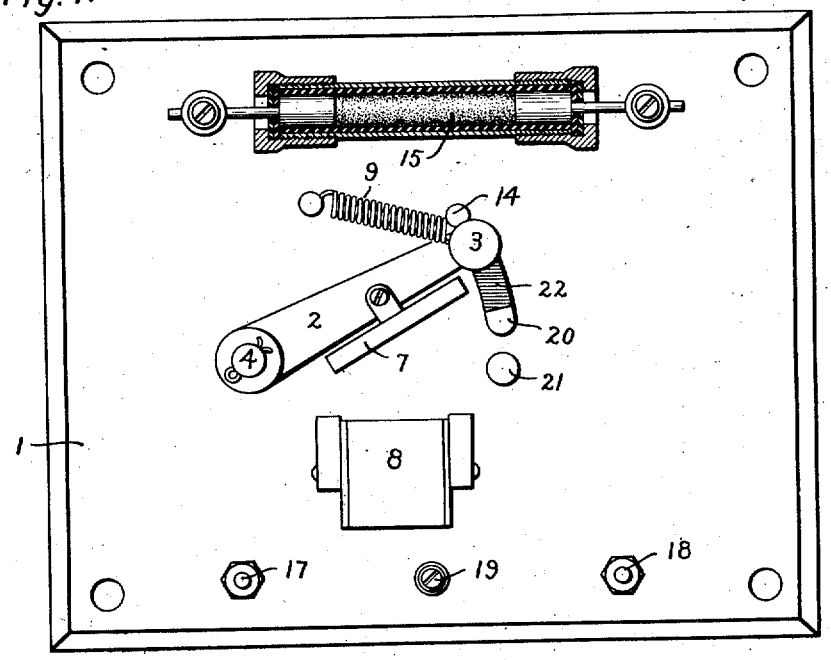
Figure 5:
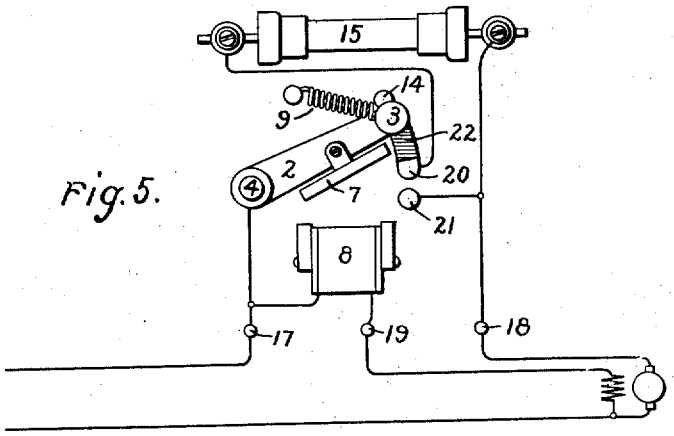

In Figs. 4 and 5 I have shown a modification of my invention designed for use with small motors, especially those which are brought up to speed before the load is thrown on. This controller is not automatic in its action and for this reason is much more simple, and hence less expensive to construct, than that shown in Fig. 1. In this form of my invention I employ only one pivoted switch-arm, and I provide two contact-studs 20 and 21 in the path of movement of this arm and connect these studs to opposite sides of the self-reducing resistance 15. Also I mount a strip of fiber 22 or similar material on the base-plate 1 to support the switch-arm when in the off position. To start the motor, the switch-arm is turned to bring it in contact with the stud 20, thus closing circuit through resistance 15 to the motor armature. The arm is held in this position for a few seconds, during which the motor comes up to speed rapidly and the ohmic value of the resistance 15 falls gradually to the desired amount. The arm is then moved into engaging relation to the stud 21, thereby short-circuiting the resistance 15. In this position the arm is held by the retaining-magnet 8, as before, and in case of a drop in the voltage it is released by the magnet and retracted to the off position by the spring 9.

I have illustrated and described herein the form of my invention which I prefer to use; but I do not wish to be understood as limited in any way to this specific device, as many modifications can be made therein which I consider within the scope of my invention and which I aim to cover in the claims appended hereto.

What I claim as new and desire to secure by Letters Patent of the United States, is:—

1. A motor-starting rheostat having a self-reducing resistance, means for closing circuit therethrough, a movable switch-arm, means whereby said arm when moved short-circuits the resistance, and means for retarding the movement of the switch-arm.

2. A motor-starting rheostat, having a self-reducing resistance, an electromagnet, means for closing circuit through the resistance and the coils of the electromagnet in parallel, a contact, a switch-arm movable into engaging relation to said contact to short-circuit the resistance, and means whereby the electromagnet retards the movement of the switch-arm.

3. A motor-starting rheostat, having a self-reducing resistance, means for closing circuit therethrough, a contact, a switch-arm arranged to fall by gravity into engaging relation to said contact to short-circuit the resistance, and means for arresting the movement of the switch-arm until the ohmic value of the resistance falls to a predetermined amount.

4. A motor-starting rheostat, having a self-reducing resistance, means for closing circuit therethrough, a contact, a switch-arm movable into engaging relation to the contact to short-circuit said resistance, an armature carried by the switch-arm, and a magnet arranged to retard the movement of the switch-arm.

5. A motor starting rheostat, having a self-reducing resistance, an electromagnet, means for closing circuit through the resistance and the coils of the electromagnet in parallel, a contact, a switch-arm movable into engaging relation to the contact to short-circuit the resistance, and an armature carried by the switch-arm, said electro-magnet having its poles in proximity to the path of movement of said armature whereby movement of the switch-arm is retarded.

6. A motor-starting rheostat having a self-reducing resistance, means for closing circuit therethrough, a switch-arm movable to short-circuit said resistance, an armature carried by the switch-arm, and a magnet by which the armature passes when the switch-arm moves to the short-circuiting position.

7. A motor-starting rheostat having a self-reducing resistance, an electromagnet, means for closing circuit through the resistance and the coils of the electromagnet in parallel, a switch-arm movable to short-circuit the resistance, and an armature carried by the switch-arm, said electromagnet being so arranged that said armature passes its poles when the switch-arm moves to the short-circuiting position.

8. A motor-starting rheostat, having a resistance, two independently-movable switch-arms, a contact coöperating with the first arm to close circuit through the resistance, a contact coöperating with the second arm to short-circuit the resistance, means whereby movement of the first arm releases the second arm, and means for retarding the movement of the second arm.

9. A motor-starting rheostat, having a self-reducing resistance, two independently-movable switch-arms, a contact coöperating with the first arm to close circuit through the resistance, a contact coöperating with the second arm to short-circuit the resistance, means whereby movement of the first arm releases the second arm, and means dependent upon the ohmic value of the resistance for arresting the movement of the second arm.

10. A motor-starting rheostat, having a self-reducing resistance, two switch-arms independently pivoted at the same point, a contact coöperating with one arm to close circuit through the resistance, a contact coöperating with the other arm to short-circuit the resistance, means whereby movement of the first arm releases the second arm, means dependent upon the ohmic value of the resistance for retarding the movement of the second arm, means whereby both arms are held in the "on" position, and means for returning both arms to the "off" position on failure of the line voltage.

11. In a motor-starting switch, means for closing the starting circuit of the motor, a contact, a switch-arm arranged to fall by gravity into engaging relation to said contact to establish the running connections of the motor, a magnet-winding adapted to suspend said switch-arm by the direct magnetic pull of said magnet-winding, and means for impressing on the terminals of said magnet-winding an automatically decreasing electromotive force.

12. In a motor-starting switch, means for closing the starting-circuit of the motor, a movable switch-arm adapted when moved to establish the running connections of the motor, an armature carried by said switch-arm, an electromagnet having its poles in proximity to the path of movement of said armature whereby movement of the switch-arm is arrested by the direct magnetic pull of said magnet, and means for impressing upon the terminals of said electromagnet an automatically-decreasing voltage.

13. In a motor-starting switch, means for closing the starting circuit of the motor, a contact, a mechanically supported switch-arm, a magnet winding, means for removing the support from the switch arm and simultaneously causing said arm to be suspended by the direct magnetic pull of said magnet winding when the starting circuit of the motor is closed, and means for impressing on the terminals of said magnet winding an automatically decreasing electromotive force whereby the switch arm will be released and fall by gravity into engaging relation to said contact to establish the running connections of the motor.

14. In a motor-starting switch, means for closing the starting circuit of the motor, a contact, a mechanically supported switch-arm, a magnet winding, means for removing the support from the switch arm and simultaneously causing said arm to be suspended by the direct magnetic pull of said magnet winding when the starting circuit of the motor is closed, means for impressing on the terminals of said magnet winding an automatically decreasing electromotive force whereby the switch arm will be released and fall by gravity into engaging relation with said contact to establish the running connections of the motor, and means whereby the switch arm is raised and the mechanical support restored upon abnormal decrease of voltage.

In witness whereof, I have hereunto set my hand this 31 day of August, 1910

ERNEST SCHATTNER.

Witnesses:

FREDK. J. SKOYLES,

H. D. JAMESON.